(12) United States Patent
Almeda et al.

(10) Patent No.: US 7,734,286 B2
(45) Date of Patent: Jun. 8, 2010

(54) REMOTE CONTROL SYSTEM

(75) Inventors: James R. Almeda, Wabash, IN (US); Glen Thomas Lindahl, Churubusco, IN (US)

(73) Assignee: Conpact, Inc., Durham, NC (US)

( * ) Notice: Subject to any disclaimer, the term of this patent is extended or adjusted under 35 U.S.C. 154(b) by 74 days.

(21) Appl. No.: 12/255,870

(22) Filed: Oct. 22, 2008

(65) Prior Publication Data

US 2009/0054050 A1  Feb. 26, 2009

Related U.S. Application Data

(60) Division of application No. 11/640,582, filed on Dec. 18, 2006, which is a continuation of application No. 11/228,769, filed on Sep. 16, 2005, now Pat. No. 7,155,213.

(51) Int. Cl.
*H04M 3/00* (2006.01)
(52) U.S. Cl. .................. 455/419; 455/418; 455/420; 340/825.22; 340/825.25; 340/825.69; 340/825.76; 379/102.01; 379/102.03
(58) Field of Classification Search ......... 455/418–420; 379/102.01–102.03; 340/825.22–825.25, 340/825.69, 825.76
See application file for complete search history.

(56) References Cited

U.S. PATENT DOCUMENTS

| | | |
|---|---|---|
| 4,625,080 A | 11/1986 | Scott |
| 4,841,562 A | 6/1989 | Lem |
| 5,216,228 A | 6/1993 | Hashimoto |
| 5,233,646 A | 8/1993 | Kuromi |
| 5,548,635 A | 8/1996 | Bradley et al. |
| 5,566,232 A | 10/1996 | Sizer, II |
| 5,802,467 A | 9/1998 | Salazar et al. |
| 5,909,183 A | 6/1999 | Borgstahl et al. |
| 5,923,739 A | 7/1999 | Disalvo |
| 6,204,796 B1 | 3/2001 | Chan et al. |
| 6,252,883 B1 | 6/2001 | Schweickart et al. |
| 6,480,586 B1 | 11/2002 | Hayes et al. |
| 6,510,209 B1 | 1/2003 | Cannon et al. |
| 6,510,210 B1 | 1/2003 | Baughan |
| 6,510,212 B2 * | 1/2003 | Ito et al. ................ 379/102.03 |
| 6,564,056 B1 | 5/2003 | Fitzgerald |
| 6,643,495 B1 | 11/2003 | Gallery et al. |
| 6,687,486 B2 | 2/2004 | Grzeczkowski |
| 6,741,684 B2 | 5/2004 | Kaars |
| 6,754,468 B1 | 6/2004 | Sieben et al. |
| 6,775,361 B1 | 8/2004 | Arai et al. |

(Continued)

OTHER PUBLICATIONS

International Search Report for PCT/US06/35742 mailed Sep. 18, 2007, 1 page.

(Continued)

*Primary Examiner*—Vincent P Harper
*Assistant Examiner*—Dung Lam
(74) *Attorney, Agent, or Firm*—Withrow & Terranova, PLLC

(57) ABSTRACT

A method includes the steps of selecting an appliance to be controlled from a list of appliances stored in the cellular device, selecting an instruction to be communicated to the selected appliance from a list of instructions stored in the cellular device, and transmitting the instruction to a cellular interface associated with the selected appliance via a public cellular telephone infrastructure by dialing a. telephone number stored in the cellular device.

4 Claims, 6 Drawing Sheets

U.S. PATENT DOCUMENTS

| | | | |
|---|---|---|---|
| 6,775,374 | B2 | 8/2004 | Nishikawa |
| 6,792,245 | B1 | 9/2004 | Kawai |
| 6,850,149 | B2 * | 2/2005 | Park ............................ 340/7.1 |
| 6,957,111 | B2 | 10/2005 | Zhu et al. |
| 6,987,462 | B2 | 1/2006 | Bae et al. |
| 7,058,356 | B2 | 6/2006 | Slotznick |
| 7,085,556 | B2 | 8/2006 | Offer |
| 2001/0012338 | A1 | 8/2001 | Frank et al. |
| 2002/0080937 | A1 | 6/2002 | Kawamura |
| 2002/0151327 | A1 | 10/2002 | Levitt |
| 2003/0104832 | A1 | 6/2003 | Ferris |
| 2003/0153336 | A1 | 8/2003 | Williams |
| 2004/0052347 | A1 | 3/2004 | Kimura |
| 2004/0235463 | A1 | 11/2004 | Patel |
| 2005/0123109 | A1 | 6/2005 | Yamagishi et al. |
| 2006/0023862 | A1 | 2/2006 | Sutcliffe |
| 2006/0035651 | A1 | 2/2006 | Arponen et al. |
| 2007/0123346 | A1 * | 5/2007 | Perez et al. .................... 463/29 |
| 2007/0171091 | A1 * | 7/2007 | Nisenboim et al. ..... 340/825.69 |

OTHER PUBLICATIONS

"Infrared tunneling over Eithernet/IP," available from www.remotecentral.com, copyright 1998-2005 Daniel Tonks, Feb. 3, 2005, 3 pages.

Cellular Telephone Notification: Home Monitoring & Control System User Guide, p. 47, Aug. 2004, 1 page.

"Motorola Home Monitoring & Control System," available from http://broadband.motorola.com/consumers/home_monitoring.asp, copyright 2005 Motorola, Inc., printed Dec. 29, 2005, 2 pages.

"Snapstream Press Release—Snapstream Media's Personal Video Station 3 is Now Shipping," available from http://www.snampstream.com/press/PR-2003-05-29-A.asp, copyright 2003-2005 SnapStream Media, Inc., printed Mar. 8, 2006, 3 pages.

"Record TV from your mobile," available from http://www.opera.com/pressreleases/en/2004/03/30, Mar. 30, 2004, printed Mar. 9, 2006, 2 pages.

* cited by examiner

REMOTE CONTROL SYSTEM

CROSS-REFERENCE TO RELATED APPLICATIONS

This patent application is a Divisional of U.S. patent application Ser. No. 11/640,582, filed Dec. 18, 2006, entitled "REMOTE CONTROL SYSTEM," which is a continuation of U.S. patent application Ser. No. 11/228,769, filed Sep. 16, 2005, entitled "REMOTE CONTROL SYSTEM," now U.S. Pat. No. 7,155,213, both of which are hereby incorporated herein by reference in their entireties.

BACKGROUND OF THE INVENTION

The present disclosure relates to a system for controlling the operation of an electrical appliance, such as a VCR or a TiVo, from a remote location. More particularly, the present disclosure relates to a system for controlling the operation of an electrical appliance from a remote location using a cellular device, such a cellular telephone or a cellular-enabled PDA.

Typically, a home has many electrical appliances—such as, VCR, DVD or any type of video or audio recording devices, TV receiver, air conditioner, furnace, thermostat, indoor and outdoor lights, and the like. It is desirable to control the operation of such appliances from a remote location. For example, it may be desirable to program a VCR to record a specified program, or to program an air conditioner or a furnace to keep the temperature in a home within a certain range.

SUMMARY OF THE INVENTION

The present invention comprises a method and an apparatus that has one or more of the following steps or features or combinations thereof, which alone or in any combination may comprise patentable subject matter:

A method is provided for controlling the operation of an appliance, such as a TV receiver or an air conditioner, from a remote location using a cellular device, such as a cellular phone or a cellular-enabled PDA. The method may include the steps of selecting an appliance to be controlled from a list of appliances stored in the cellular device, selecting an instruction to be communicated to the selected appliance from a list of instructions stored in the cellular device, and transmitting the instruction to a cellular interface associated with the selected appliance via a public cellular telephone infrastructure by dialing a telephone number stored in the cellular device.

The method may further include a step of receiving a verification from the cellular interface associated with the selected appliance that the instruction was received and/or executed via the public cellular telephone infrastructure. The method may further comprise a step of communicating to the user that the instruction was received and/or executed by the selected appliance.

In some embodiments, the step of selecting an appliance may include the steps of displaying on a screen a list of application programs including a remote control program, using a keypad to select the remote control program from the list of application programs displayed on the screen and executing the remote control program. The step of selecting an appliance may further include the step of displaying a list of appliances on the screen and using the keypad to select an appliance to be controlled from the list of appliances displayed on the screen.

In some embodiments, the step of selecting an instruction may include the steps of displaying on the screen a list of instructions associated with the selected appliance and using the keypad to select an instruction to be communicated to the selected appliance from the list of instructions.

In some embodiments, the cellular interface may be embedded in the selected appliance. The step of transmitting the instruction may include the steps of establishing a communication link with the embedded cellular interface by calling a telephone number associated with the embedded cellular interface, and sending the instruction to the embedded cellular interface via the public cellular telephone infrastructure.

In some embodiments, the cellular interface may be incorporated in a central hub associated with the selected appliance. The step of transmitting the instruction may include the steps of establishing a communication link with the cellular interface of the hub by calling a telephone number associated therewith, and sending the instruction to the hub cellular interface via the public cellular telephone infrastructure. The hub may, in turn, transmit the instruction to the selected appliance via a communication modality associated therewith, such as electric wire, infrared (IR), BlueTooth (BT), and Wi-Fi, or other wireless modality.

The method may further include a step of resetting the remote control program to the stop of selecting an appliance after the step of transmitting the instruction to the cellular interface associated with the selected appliance.

In some embodiments, the step of selecting an instruction may include the steps of displaying on the screen a graphic representation of a control panel having buttons for controlling the operation of the selected appliance and using the keypad to select an instruction to be communicated to the selected appliance. The graphic representation of the control panel may be stored in the cellular device.

In some embodiments, the step of selecting an instruction may include the steps of displaying on the screen a list of instructions associated with a selected appliance, and using a control ball to select an instruction to be communicated to the selected appliance from the list of instructions.

In some embodiments, the step of selecting an instruction may include the steps of displaying on a touchscreen display panel a list of instructions associated with a selected appliance, and using the touchscreen display panel to select an instruction to be communicated to the selected appliance from the list of instructions.

In some embodiments, the step of selecting an instruction may include the steps of displaying on the display panel a graphic representation of a control panel having buttons for controlling the operation of the selected appliance and using the touchscreen display panel to select an instruction to be communicated to the selected appliance.

In some embodiments, the stop of selecting an instruction may include the steps of displaying on the screen a list of instructions associated with the selected appliance, and using a voice recognition capability of the cellular device to select an instruction to be communicated to the selected appliance from the list of instructions displayed on the screen.

A cellular device may include a processor, a memory, a display screen, and a keypad. The processor may be configured to display a list of appliances on the screen so that a user can use the keypad to select an appliance to be controlled from the list of appliances displayed on the screen. The processor may be configured to display on the screen a list of instruction associated with the selected appliance so that a user can use the keypad to select an instruction to be communicated to the selected appliance from the list of instructions displayed on the screen. The processor may be configured to establish a communication link with a cellular interface associated with the selected appliance by calling a telephone number of the cellular interface so that the user can send the instruction to the cellular interface via a public cellular telephone infrastructure. The list of appliances, the list of instructions associated with each appliance, and the telephone number of the cellular interface may be stored in the memory.

In some embodiment, the cellular device may copse a cellular phone. In some other embodiments, the cellular device may comprise a cellular-enabled personal data assistant. The processor may be configured to receive, via the public cellular telephone infrastructure, a verification from the cellular interface associated with the selected appliance that the instruction was received and/or executed.

In some embodiments, a cellular interface may be embedded in one or more appliances. In some other embodiments, the cellular interface may be incorporated in a central hub associated with one or more appliances. The hub may transmit the instruction to a selected appliance via a communication modality associated with the selected appliance, such as electric wire, IR, BT, and Wi-Fi.

The list of appliances may include any one or more of the following appliances: a furnace, a thermostat, a wall air conditioner, a central air conditioner, a ceiling fan, a humidifier, a dehumidifier, an oscillating fan, a fire place, a VCR, A DVD, a TV, a CD player, a Jacuzzi, a personal computer, a pool, a sauna, a camcorder, an iPod, a video camera, an alarm clock, a clock radio, a sound system, a stereo, a business computer, a fax, an answering machine, a copier, a scanner, a printer, a laminator, an alarm system, a side door, a garage door, a front door, a back door, an inside light, an outside light, a video camera, a coffeemaker, a dishwasher, a microwave, and an oven.

An appliance may include a cellular interface for receiving an instruction from a cellular device via a public cellular telephone infrastructure. The cellular interface may include a processor configured to answer a call made by the cellular device to establish a communication link therewith via a public cellular telephone infrastructure so that one or more instructions can be received from the cellular device.

The processor of the cellular interface may be configured to receive a verification from the selected appliance that the instruction was received and/or executed by the appliance so that the processor can, in turn, send a verification to the cellular device that the instruction was received and/or executed by the appliance.

Additional features, which alone or in combination with any other feature(s), such as those listed above and those listed in the appended claims, may comprise patentable subject matter and will become apparent to those skilled in the art upon consideration of the following detailed description of illustrative embodiments exemplifying the best mode of carrying out the embodiments as presently perceived.

BRIEF DESCRIPTION OF THE DRAWINGS

The detailed description particularly refers to the accompanying figures, in which.

DETAILED DESCRIPTION OF THE DRAWINGS

Figure 1:
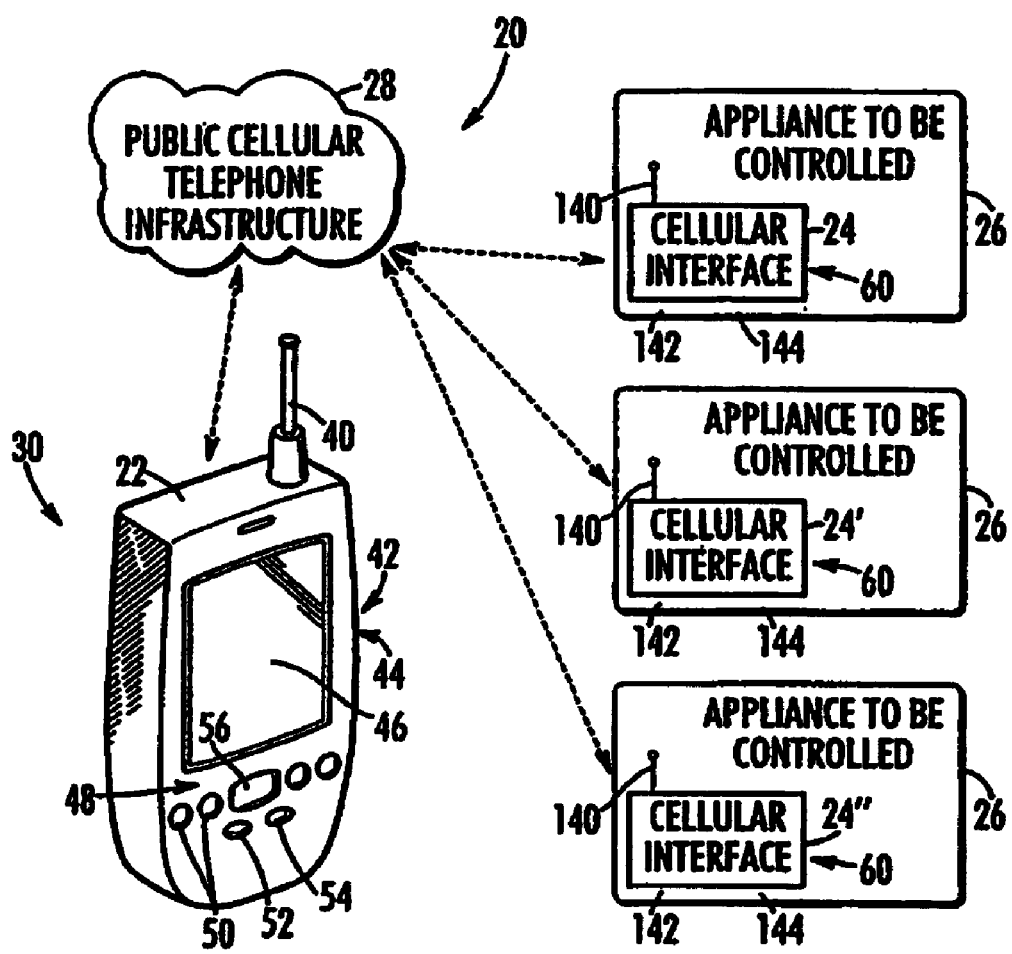
FIG. 1 is a diagrammatic view showing a remote control system for controlling the operation of an electric appliance from a remote location via a public cellular infrastructure according to a few embodiment of the present invention.

While the concepts of the present disclosure are susceptible to various modifications and alterative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Figure 2:
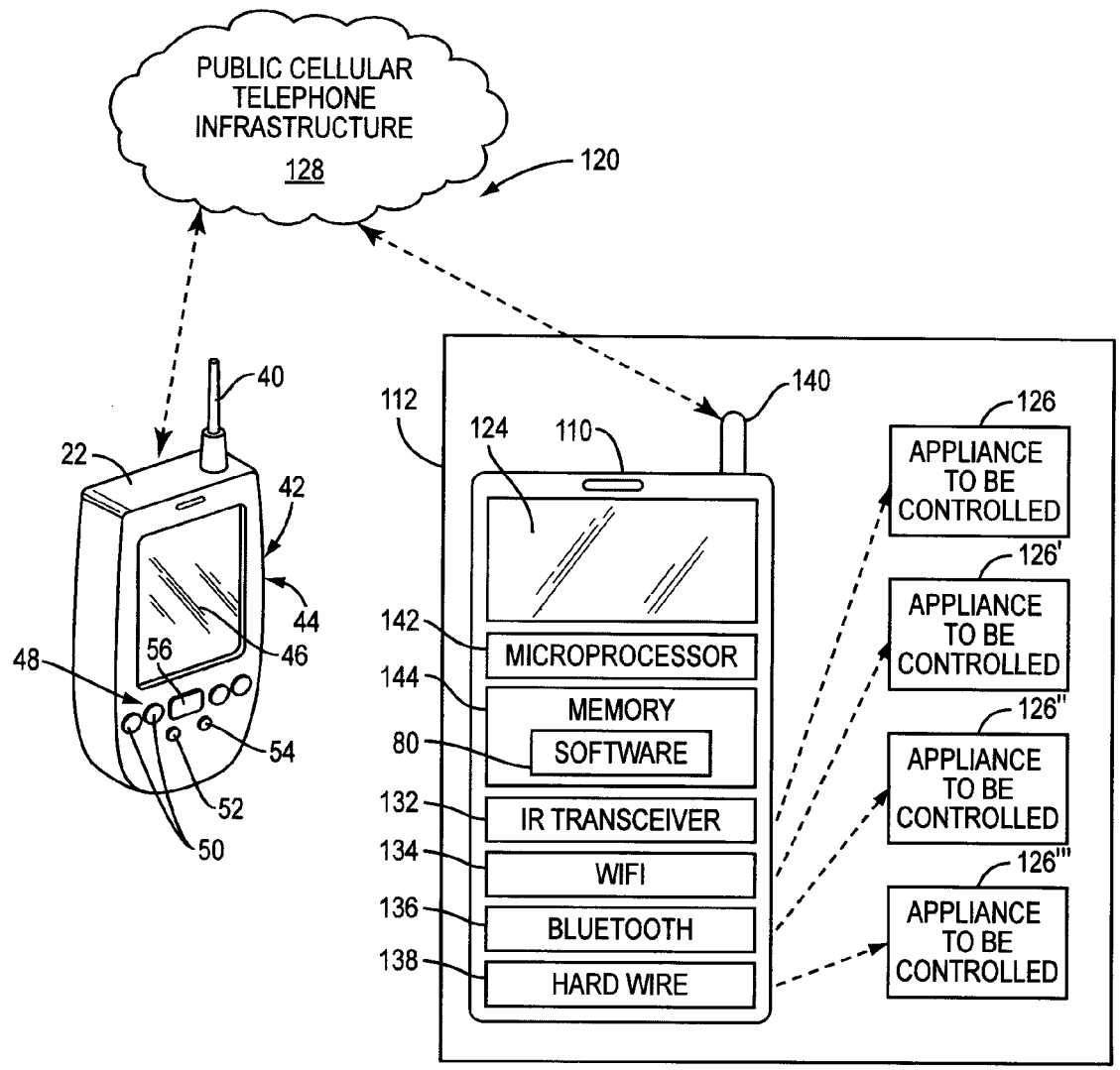
FIG. 2 is a diagrammatic view showing a remote control system for controlling the operation of an electric appliance from a remote location via a public cellular infrastructure according to a second embodiment of the present invention.
Figure 3:
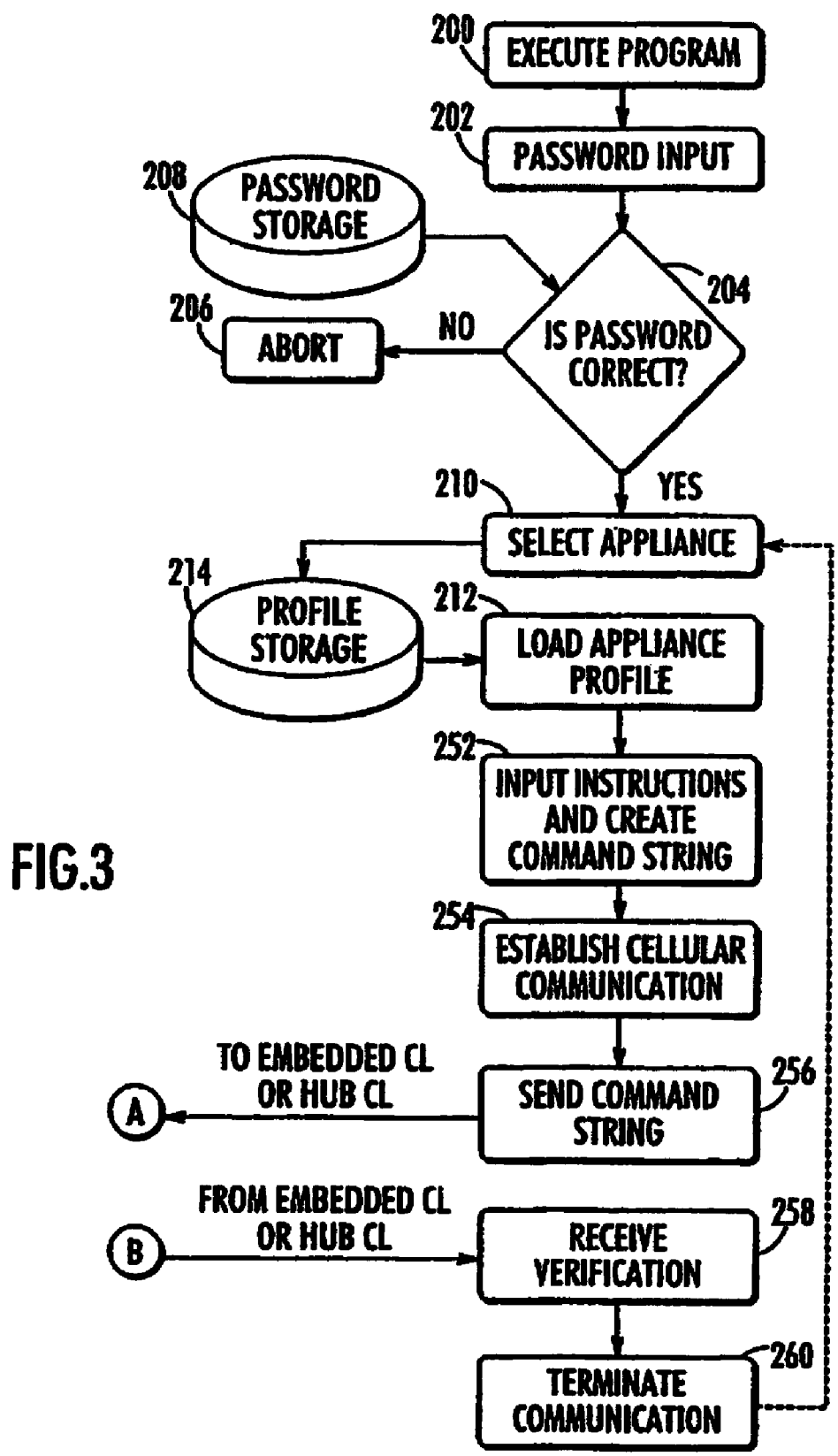
FIG. 3 is a flow chart showing exemplary tasks performed by an initiating cellular device, such a cellular telephone.
Figure 4:
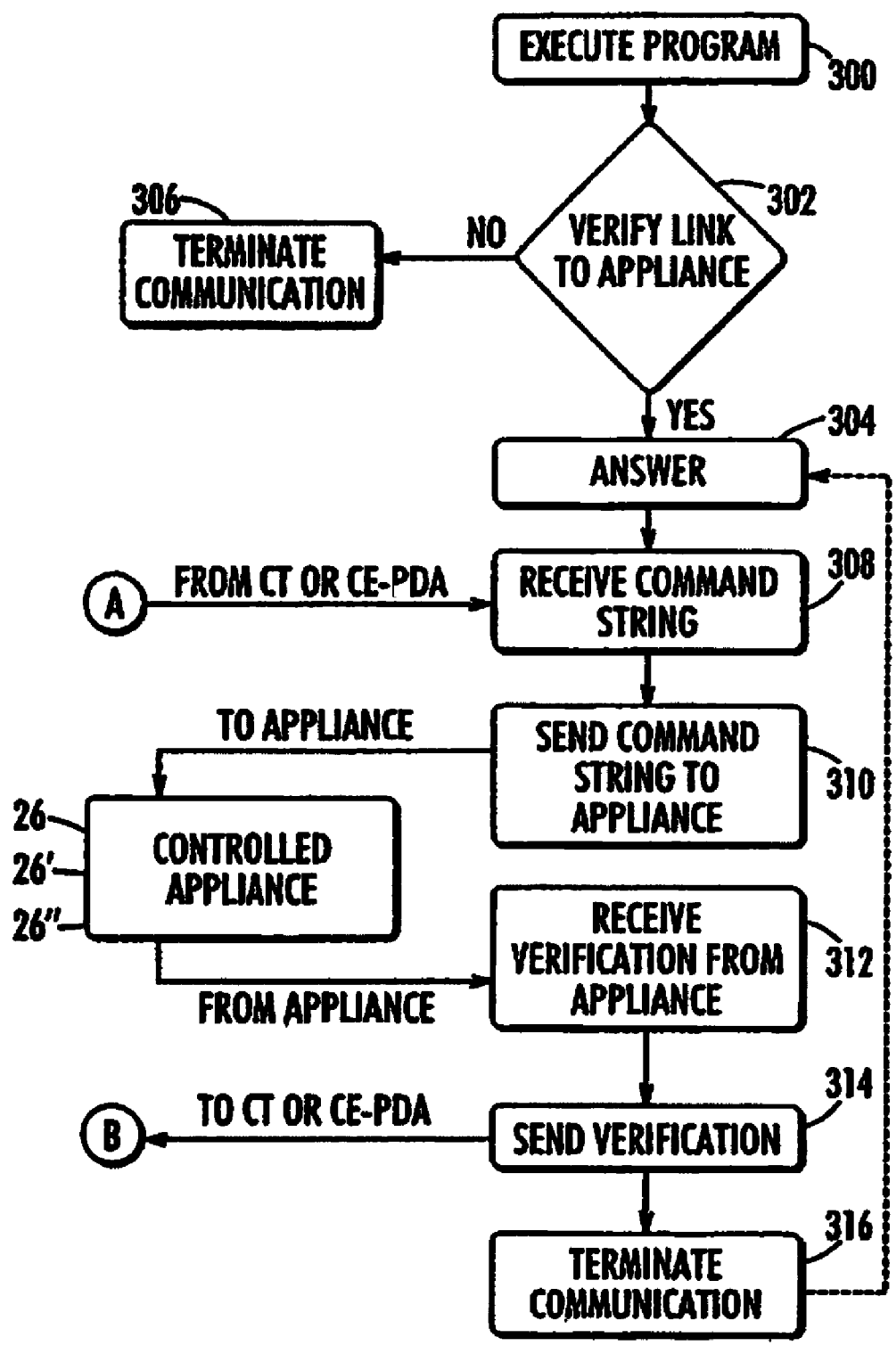
FIG. 4 is a flow chart showing exemplary tasks performed by a cellular interface embedded in a controlled appliance.
Figure 5:
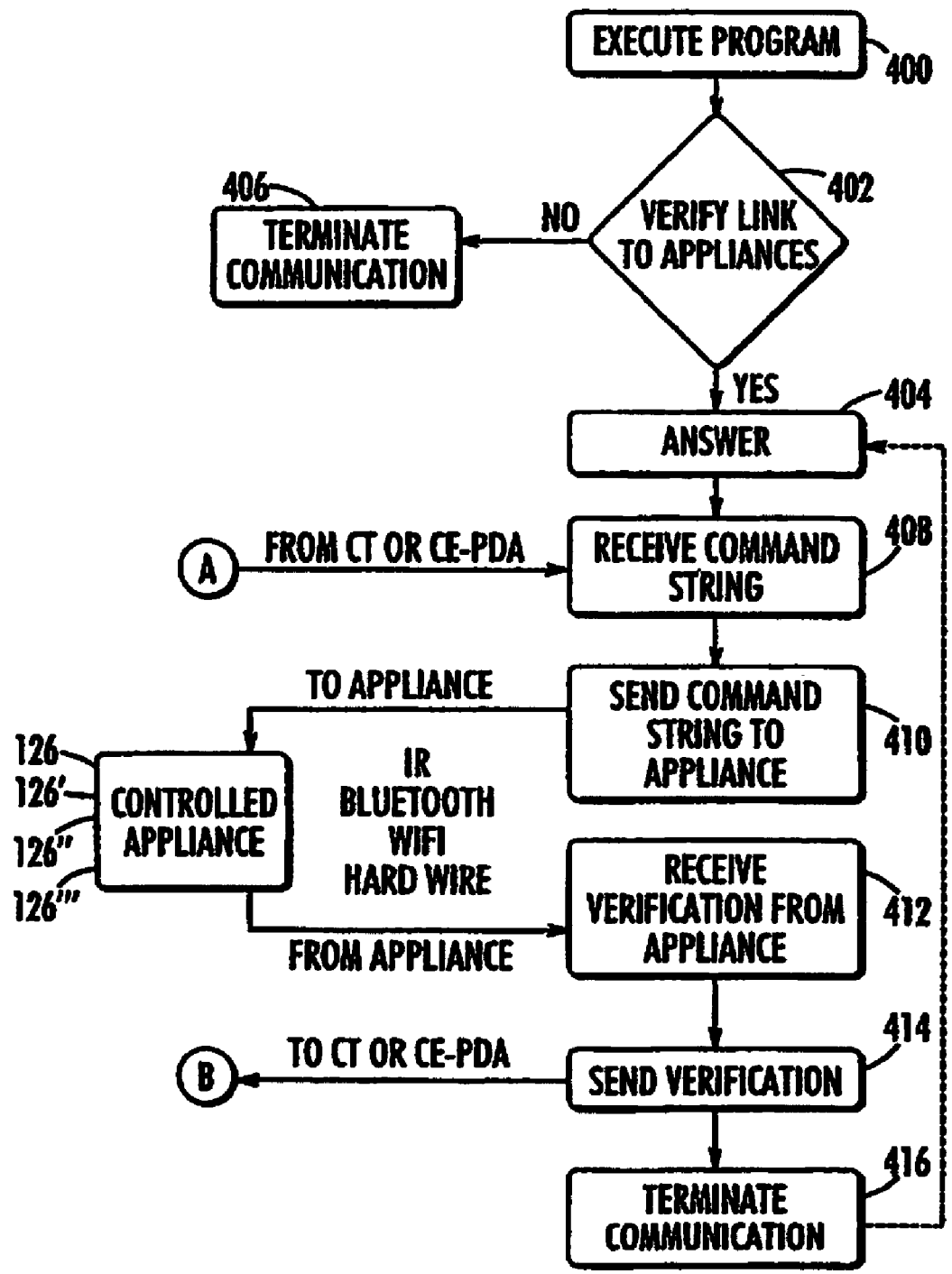
FIG. 5 is a flow chart showing exemplary tasks performed by a cellular interface incorporated in a central hub associated with a controlled appliance.

A first embodiment 20 of a remote control system according to the present disclosure is shown in FIGS. 1, 3, and 4. A second embodiment 120 of the remote control system 200 according to the present disclosure is shown in FIGS. 2, 3, and 5. Like reference numerals are used, where appropriate, to denote elements of the remote control system 120 that are substantially similar to like elements of the remote control system 20. For example, a cellular interface in the remote control system 20 is denoted by reference numeral 24, while a cellular interface in the remote control system 120 is denoted by reference numeral 124.

Referring to FIG. 1, the remote control system 20 includes a cellular device 22, such as a cellular telephone (CT) or a cellular enabled PDA (CE-PDA), that sends one or more instructions to a cellular interface 24 embedded in an appliance 26 located remote from the cellular device 20 via a public cellular telephone infrastructure 28. Likewise, the cellular device 22 sends one or more instructions to cellular interfaces 24', 24" embedded in respective appliances 26', 26" via the public cellular telephone infrastructure 28. Each cellular interface 24, 24', 24" has a unique telephone number that is stored in the cellular device 22. The appliances 26, 26', 26" may all be located at the same location or at different locations. Illustratively, the cellular device 22 may be a cellular telephone, Model V55, manufactured by Motorola.

The cellular device 22 has on-board software program 30 that enables a user to select an appliance to be controlled from a list of appliances (such as appliances 26, 26', and 26"), to select an instruction to be communicated to the selected appliance from a list of instructions, and to transmit the instruction to the cellular interface embedded in the selected appliance via the public cellular telephone infrastructure 28 by dialing a telephone number. In addition, the program 30 enables the user to receive a verification from a cellular interface 24 embedded in a selected appliance that the instruction was received and/or executed via the public cellular telephone infrastructure.

As diagrammatically shown in FIG. 1, the illusive cellular device 22 has an antenna 40, a microprocessor 42, a memory 44, a touchscreen display panel 46, a keypad 48 having a plurality of buttons 50, a microphone 52, a speaker 54, a control ball 56, a graphic capability, and a voice recognition capability. The cellular interface 24, on the other hand, has an antenna 140, a microprocessor 142, and a memory 144. As used in the specification and claims, a cellular interface (also referred to as a transceiver) is functionally substantially the same as a cellular device, but without a display screen, a keypad, a microphone, and a speaker. The memory 44 of the cellular device 22 stores a list of the appliances, a list of instructions associated with each appliance and a telephone number associated with a cellular interface embedded in each appliance.

As shown in FIG. 2, in the second embodiment of the remote control system 120, the cellular device 22 sends an instruction to a cellular interface 124 incorporated in a central hub 110 associated with a plurality of appliances, such as appliances 126, 126', 126", 126'" remote from the cellular device 22 via the public cellular telephone infrastructure 28. The hub 110, in turn, transmits the instruction to the selected appliance in machine accessible code (MAC) format, or other comparable format, using a communication modality that is appropriate for the selected appliance. Thus, if an appliance has a wireless modality, the hub 110 transmits the user instructions to the selected appliance using wireless modality, such as IR, BT, and Wi-Fi. On the other hand, if an appliance does not have a wireless modality, the hub 110 transmits the user instructions to the selected appliance over electric wires. In the illustrated embodiment, the appliances 126, 126', 126", 126'" are all located in a building 112, such as a home or an office, The cellular interface 124 has an antenna 140, a microprocessor 142, and a memory 144. As used in the specification and claims, the cellular interface 124 is functionally substantially the same as the cellular device 22, but without a display screen, a keypad, a microphone, and a speaker. The cellular interface 124 has on-board software 80 or converting the user instructions received from the cellular device 22 to command strings in MAC format, or other comparable format, for transmission to the respective appliances 126, 126', 126", 126'". In the embodiment illustrated in FIG. 2, the hub 110 is equipped with an IR modality 132, a BT modality 134, a Wi-Fi modality 136, and a hard wire modality 138. Illustratively, the hub 110 uses the IR modality 132 to transmit an instruction to an appliance having the IR modality, the BT modality 134 to transmit an instruction to an appliance having the BT modality, and the Wi-Fi modality 136 to transmit an instruction to an appliance having the Wi-Fi modality. On the other hand, the hub 110 transmits an instruction to an appliance, such as a thermostat, not having a wireless modality over electric wires. It will be understood that the list of modalities in this paragraph is illustrative, and not exhaustive.

The cellular interface 124 has a unique telephone number that is stored in the cellular device 22. As indicated above, the software program 30 stored in the cellular device 22 enables a user to select an appliance to be controlled from a list of appliances (such as appliances 126, 126', 126", 126'"), and to select an instruction to be communicated to the selected appliance from a list of instructions. In addition, the program 30 enables the user to transmit the instruction to the cellular interface 124 via the public cellular telephone infrastructure 128 by dialing a telephone number. As indicated above, the hub 110, in turn, transmits the instruction to the selected appliance in the MAC format, or other comparable format, via a modality that is appropriate for the selected appliance.

Moreover, with respect to appliances having a bi-directional communication capability, the program 30 enables the user to receive a verification from the cellular interface 124 that the instruction was received and/or executed by the selected appliance via the public cellular telephone infrastructure. Verification is received only from appliances having a bi-directional capability, and not from appliances having a receive-only capability. The memory 144 of the cellular interface 124 stores a list of the appliances, a list of instructions associated with each appliance and a telephone number associated with the hub cellular interface associated with the appliances.

FIG. 3 is a flow chart showing illustrative steps performed by the initiating cellular device 22 when the remote control program 30 stored therein is executed during the operation of the remote control systems 20, 120. As indicated by block 200, when the user presses a menu button 44 on the cellular device 22, a menu or a list of programs, including the program 30, is displayed on the screen 46 of the cellular device 22. The user then selects the program 30, which is then executed. At block 202, the program 30 requests the user's password, and the user provides the password. The program 30 determines if the user's password is correct at block 204. If the user enters a correct password, the program 30 continues to the next step 210. If the user enters a wrong password, the program 30 terminates indicated by block 206. The user's password is located in a file 208 stored in the cellular device 22. If there are multiple users, multiple passwords are stored in the file 208.

At block 210, the program 30 displays on the screen 46 a list of appliances that can be remotely controlled, such as an air conditioner, a VCR, a DVD, etc. The user then selects an appliance for remote programming from the list of appliances. In the embodiment illustrated in FIG. 3, upon selection of an appliance, the program 30 displays on the screen 46 a graphic representation of a control panel having buttons for controlling the operation of the selected appliance at block 212. The graphic representations of the control panels of the various appliances that can be remotely controlled are located in a file 214 stored in the cellular device 22. The program 30 includes graphic software that enables it to display a control panel. In some embodiments, the program 30 displays a remote control associated with a selected appliance, such as a TV receiver, instead of a control panel.

Figure 6:
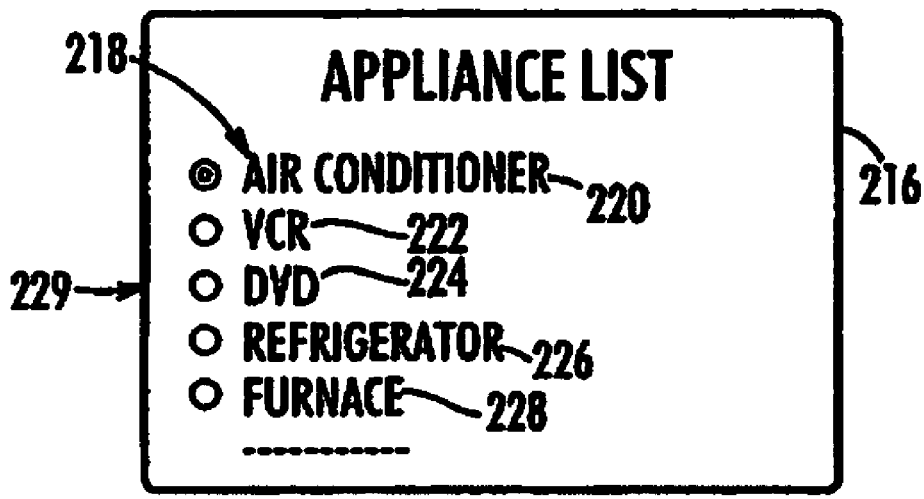
FIGS. 6 and 7 are screen shots of screen that appear on a display screen of the initiating cellular device.
Figure 7:
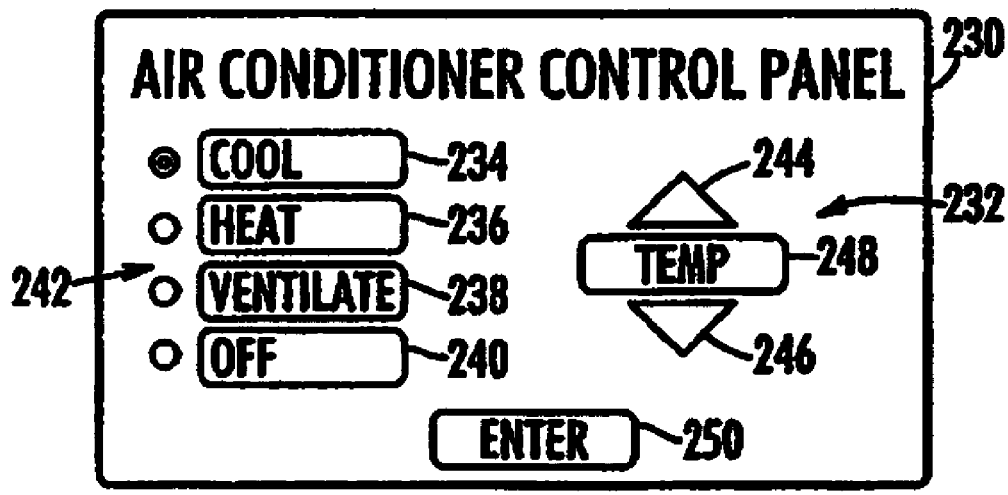

FIG. 6 is an illustrative screen shot 216 of a screen showing a list 218 of appliances. As shown therein, the illustrative list 218 includes an air conditioner 220, a VCR 222, a DVD player, 224, a refrigerator 226, and a furnace 228. The selection of an appliance is indicated by LED lights 229 arranged along a left side of the screen shot 216. FIG. 7 is an illustrative screen shot 230 of a screen showing a control panel 232 of the air conditioner 220. As shown therein, the control panel 232 includes a plurality of buttons for selecting the mode of operation of the air conditioner 220, such as a cool button 234, a heat button 236, a ventilate button 238, and an off button 240. The selection of a mode is indicated by LED lights 242 arranged along a left side of the screen shot 230. In addition, the control panel 232 includes a button 244 for increasing the room temperature setting and a button 246 for decreasing the room temperature setting. The temperature setting is indicated in a window 248. The control panel 232 has a button 250 for inputting the operation mode and the temperature setting to the program 30 upon completion of selection.

At block 252, the user inputs one or more instructions (i.e., the tasks to be performed by the appliances) that are to be transmitted to the selected appliance. For example, in the case of the air conditioner 220, the user selects a mode, such as a cool mode, and sets the temperature, such as 70° F. The user uses the button 250 to input his instructions. The program 30 then creates command strings that correspond to the instructions for transmission to the air conditioner 220. The command strings may be a series of ones and zeros. The command strings may be temporarily stored in a buffer memory of the cellular device 22 until their transmission to the selected appliance.

In some embodiments, at block 254, the program 30 calls a stored number of the cellular interface 24 embedded in the selected appliance to establish a communication link between the cellular device 22 and the embedded cellular interface 24. In some other embodiments, at block 254, the program 30 calls a stored number of the cellular interface 124 incorporated in the hub 110 associated with a selected appliance to establish a communication link between the cellular device 22 and the hub cellular interface 124. At block 256, the command strings are transmitted to the embedded cellular interface 24 or the hub cellular interface 124. As indicated above, the hub 110, in turn, transmits the instruction to the selected appliance in the MAC format, or other comparable format, via a modality that is appropriate for the selected appliance, such as IR, BT, Wi-Fi, and the like.

At block 258, with respect to the appliances having bi-directional capability, the embedded or hub cellular interface 24, 124 sends a verification to the program 30 that the command strings were received and/or executed. The program 30 then terminates communication with the embedded or hub cellular interface 24, 124, and resets to the select appliance step 210.

FIG. 4 is a flow chart showing illustrative seeps performed by the embedded cellular interface 24 when the software program 60 stored therein is executed during the operation of the remote control system 20. FIG. 5 is a flow chart showing illustrative steps performed by the hub cellular interface 124 when the software program 80 stored therein is executed during the operation of the remote control system 120. The steps performed by the program 80 are substantially the same as the steps performed by the program 60 except steps 310, 410 where the instructions are transmitted from the cellular interfaces 24, 124 to the respective appliances 26, 126. In the remote control system 20 of FIG. 1, the cellular interfaces 24, 24', 24" are embedded in the respective appliances 26, 26', 26". The command strings are, therefore, transmitted from the embedded cellular interfaces 24, 24', 24" to the respective appliances 26, 26', 26" internally over electric lines. In the remote control system 120, however, the user instructions are transmitted from the hub cellular interface 124 to the respective appliances 126, 126', 126", 126''' in the MAC format, or other comparable format, via a modality that is appropriate for the selected appliance, such as IR, BT, Wi-Fi, and hard wire.

Referring to FIG. 4, as indicated by block 300, when the user plugs in an appliance, the operating program 60 is executed during the operation of the remote control system 20. At block 302, the program 60 verifies the link between the embedded cellular interfaces 24, 24', 24" and the associated appliances 26, 26', 26". If the links are working correctly, the program 60 continues to the next step 304. If the links are not working correctly, the program 60 terminates as indicated by block 306. In some embodiments, if the links are not working correctly, the program 60 notifies the cellular device 22 before terminating communication therewith that one or more appliances are currently not available for remote programming.

At block 304, the program 60 awaits an incoming call from the cellular device 22. When the cellular device 22 calls, the program 60 answers the call to establish a communication link between the cellular device 22 and the embedded cellular interface 24, 24', 24". Thus, if the user selects the appliance 26 for remote control a communication link is established between the cellular device 22 and the embedded cellular interface 24 associated with the selected appliance 26. If the user selects the appliance 26' for remote control, a communication link is established between the cellular device 22 and the embedded cellular interface 24' associated with the selected appliance 26', and so on.

At block 308, the program 60 receives the command strings from the cellular device 22. At block 310, the program 60 sends the command strings to the selected appliance 26, 26', 26" internally over electric lines. Thus, if the user selects the appliance 26 for remote control, the program 60 sends the command strings to the appliance 26. If the user selects the appliance 26' for remote control, the program 60 sends the command stings to the appliance 26', and so on. The selected appliance 26, 26', 26" then executes the command strings. For example, a VCR may be programmed to record a specified program, or an air conditioner or a furnace may be programmed to keep the temperature in a home within a certain range.

At block 312, the program 60 receives a verification from the selected appliance 26, 26', 26" that the command strings were executed when the selected appliance 26, 26', 26" executes the command strings. At block 314, the program 60 establishes a communication link with the cellular device 22. The communication link is established by calling a stored number of the cellular device 22. The program 60 then sends a verification to the cellular device 22 that the command strings were executed by the selected appliance 26, 26', 26". At block 316, the program 60 terminates communication with the cellular device 22 and resets to the answer step 304 where the program 60 awaits next incoming call from the cellar device 22.

As indicated above, FIG. 5 is a flow chart showing illustrative steps performed by the hub cellular interface 124 when the software program 80 stored therein is executed during the operation of the remote control system 120. As indicated by block 400, when the user plugs in the central hub 110, the operating program 80 is executed. At block 402, the program 80 verifies the link between the hub cellular interface 124 and each of the associated appliances 126, 126', 126", 126'''. If the links are working correctly, the program 80 continues to the next step 404. If the links are not working correctly, the program 80 terminates as indicated by block 306. In some embodiments, if the links are not working correctly, the program 80 may notify the cellular device 22 before terminating communication therewith that one or more appliances are currently not available for remote programming.

At block 404, the program 80 awaits an incoming call from the cellular device 22. When the cellular device 22 calls, the program 80 answers the call to establish a communication link between the cellular device 22 and the hub cellular interface 124. At block 408, the program 80 receives the command strings from the cellular device 22. At block 410, the program 60 sends the command strings in the MAC format, or other comparable format, to the selected appliance 126, 126', 126", 126''' using a modality that is appropriate for the selected appliance 126, 126', 126", 126'''. Thus, the program 60 uses the IR modality 132 to transmit an instruction to an appliance having the IR modality, the BT modality 134 to transmit an instruction to an appliance having the BT modality, the Wi-Fi modality 136 to transmit an instruction to an appliance having the Wi-Fi modality. The program 60 transmits an instruction to an appliance not having a wireless modality, such as a thermostat, over electric wires. The selected appliance 126, 126', 126", 126''' then executes the command strings. For example, a VCR may be programmed to record a specified program, or an air conditioner or a furnace may be programmed to keep the temperature in a home within a certain range.

At block 412, with regard to appliances 126, 126', 126", 126''' that have a bi-directional capability, the program 80 receives a verification from the appliance 126, 126', 126", 126''' that the command strings were executed when the selected appliance 126, 126', 126", 126''' executes the command strings. At block 414, the program 80 establishes a communication link with the cellular device 22. The communication link is established by calling a stored number of the cellular device 22. The program 80 then sends a verification to the cellular device 22 that the command strings were executed by the selected appliance 126, 126', 126", 126'''. At block 416, the program 80 terminates communication with the cellular device 22 and resets to the answer step 4304 where the program 60 awaits next incoming call from the cellular device 22.

In the remote control system 20 of FIG. 1, the cellular device 22 sends instructions to the cellular interfaces 24, 24', 24" embedded in respective appliances 26, 26', 26". In the remote control system 120 of FIG. 2, the cellular device 22 sends instructions to the cellular interfaces 124 incorporated in the hub 110 associated with a plurality of appliances 126, 126', 126", 126'''. In a remote control system according to a third embodiment, the cellular device 22 sends instructions to the cellular interfaces 24, 24', 24" embedded in a respective one of the first plurality of appliances 26, 26', 26", and, in addition, sends instructions to the cellular interfaces 124 incorporated in the hub 110 associated with the second plurality of appliances 126, 126', 126", 126'''.

In the illustrated embodiment, the user may provide inputs to the program 30 in a number of ways. 1) The program 30 displays a list of items on the screen. The user selects an item by pressing one or more keys 50 on the keypad 48 that cold to a selected item. For example, a channel up key having a "1" marked thereon may be operated by pressing the number "1" key, and a channel down key having a "2" marked thereon may be operated by pressing the number "2" key. 2) The program 30 displays a list of items on the screen. The user selects an item by using the control ball 56. 3) The program 30 displays a list of items on the touchscreen display panel 46. The user then selects an item by touching the item on the touchscreen display panel 46. 4) The program 30 displays a graphic representation of the choices on the display panel 46, for example, as shown in FIG. 7. The user then makes a choice by touching an icon on the touchscreen display panel 46 that corresponds to his choice. 5) The program 30 displays a list of items on the screen 46. The user then selects an item by speaking into a microphone. It will be understood that this list of ways of providing inputs to the program is illustrative, not exhaustive.

Illustratively, some of the examples of appliances that can be controlled from a remote location using the cellular device 22 via the public cellular telephone infrastructure 28 are as follows: a furnace, a thermostat, a wall air conditioner, a central air conditioner, a ceiling fan, a humidifier, a dehumidifier, an oscillating fan, a fire place, a VCR, A DVD, a TV, a CD player, a Jacuzzi, a personal computer, a pool, a sauna, a camcorder, an iPod, a video camera, an alarm clock, a clock radio, a sound system, a stereo, a business computer, a fax, an answering machine, a copier, a scanner, a printer, a laminator, an alarm system, a side door, a garage door, a front door, a back door, an inside light, an outside light, a video camera, a coffeemaker, a dishwasher, a microwave, and an oven. It will be understood that his list is illustrative, not exhaustive.

While the disclosure is susceptible to various modifications and alternative forms, specific exemplary embodiments thereof have been shown by way of example in the drawings and have herein been described in detail. It should be understood, however, that there is no intent to limit the disclosure to the particular forms disclosed, but on the contrary, the intention is to cover all modifications, equivalents, and alternatives falling within the spirit and scope of the disclosure as defined by the appended claims.

There are a plurality of advantages of the present invention arising from the various features of the embodiments described herein. It will be noted that alternative embodiments of the present invention may not include all of the features described yet still benefit from at least some of the advantages of such features. Those of ordinary skill in the art may readily devise their own implementations of a device that incorporates one or more of the features of the present invention and fall within the spirit and scope of the present invention as defined by the appended claims.

The invention claimed is:

1. A hub for controlling one or more appliances based on communications with a cellular device, the hub comprising:
   a cellular interface;
   a communications mechanism configured to transmit instructions to the one or more appliances;
   a memory configured to store a cellular telephone number associated with the cellular device;
   a processor operatively coupled with the cellular interface and the memory, wherein the processor is programmed to:
      answer an incoming telephone call from the cellular device, wherein answering the incoming telephone call establishes a communication link between the hub and the cellular device via a public cellular network;
      receive a command string from the cellular device over the public cellular network;
      determine which of the one or more appliances is an intended recipient of the command string;
      send the command string to the intended recipient via the communication mechanism;
      retrieve the cellular telephone number associated with the cellular device from the memory;
      dial the cellular telephone number associated with the cellular device upon completion of executing the command string, wherein dialing the cellular telephone number establishes a communication link between a controller and the cellular device via the public cellular network; and
      send verification to the cellular device that the command string has been executed via the public cellular network.

2. The hub of claim 1, wherein the communications mechanism is configured to communicate with an appliance via infrared communications.

3. The hub of claim 1, wherein the communications mechanism is configured to communicate with an appliance via Bluetooth communications.

4. The hub of claim 1, wherein the communications mechanism is configured to communicate with an appliance via WiFi communications.

* * * * *